United States Patent [19]

Marver et al.

[11] 4,251,875
[45] Feb. 17, 1981

[54] SEQUENTIAL GALOIS MULTIPLICATION IN GF($2^n$) WITH GF($2^m$) GALOIS MULTIPLICATION GATES

[75] Inventors: James M. Marver, Minneapolis; Wayne R. Olson, Prior Lake, both of Minn.

[73] Assignee: Sperry Corporation, New York, N.Y.

[21] Appl. No.: 11,287

[22] Filed: Feb. 12, 1979

[51] Int. Cl.³ ........................... G06F 7/52; G06F 7/38
[52] U.S. Cl. .................................... 364/754; 364/736
[58] Field of Search ................ 364/754, 757, 736, 715

[56] References Cited

U.S. PATENT DOCUMENTS

| | | | |
|---|---|---|---|
| 3,805,037 | 4/1974 | Ellison | 364/715 |
| 4,037,093 | 7/1977 | Gregg et al. | 364/757 |
| 4,162,480 | 7/1979 | Berlekamp | 364/736 X |

OTHER PUBLICATIONS

Law, Jr. et al., "A Cellular-Array Multiplier For GF($2^m$)", *IEEE Trans. on Computers*, vol. C-20, No. 12, Dec. 1971, pp. 1573–1578.
Ellison, "Galois Logic Design", Data Sciences Laboratory, AFCRL-70-0583, Oct. 1970, pp. 1–159.
Marver, "Squential Galois Multipliers", Office of Naval Research, PX 12344, Aug. 1977, pp. 1–14.
Marver et al., "Complexity Reduction in Galois Logic Design", Office of Naval Research, PX 12461, Dec. 1977, pp. 1-1-A-2.

*Primary Examiner*—David H. Malzahn
*Attorney, Agent, or Firm*—Kenneth T. Grace; William E. Cleaver; Marshall M. Truex

[57] ABSTRACT

Configurations of Boolean elements for implementing a sequential GF($2^n$) Galois multiplication gate are disclosed. Each configuration includes a single subfield GF($2^m$) Galois multiplication gate, where m is a positive integral divisor of n, e.g., n=8 and m=2, and assorted controls. Also disclosed is a sequential implementation of a GF($2^n$) Galois linear module as described in the J. T. Ellison Pat. No. 3,805,037 wherein the controls of the sequential GF($2^n$) multiply gate cause the Galois addition (bit-wise Exclusive-OR) of an n-bit binary vector, Z, to the final Galois product.

11 Claims, 12 Drawing Figures

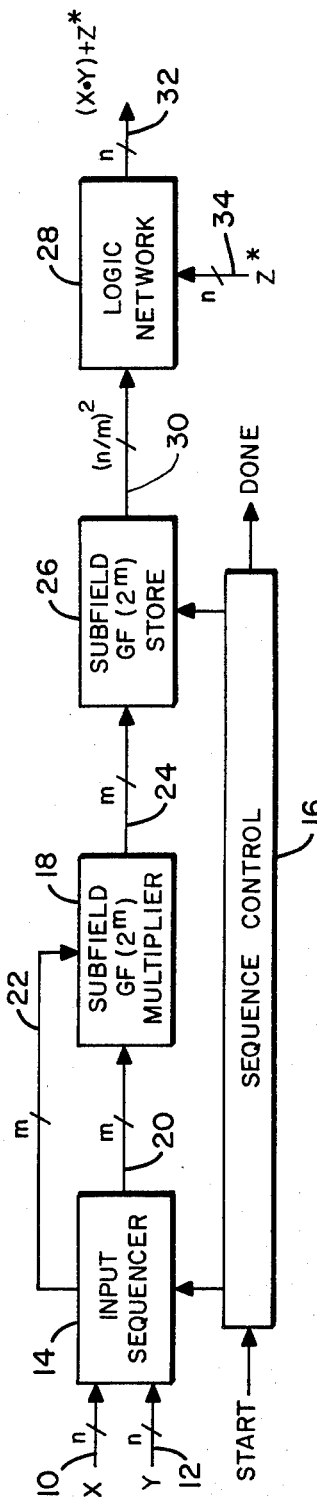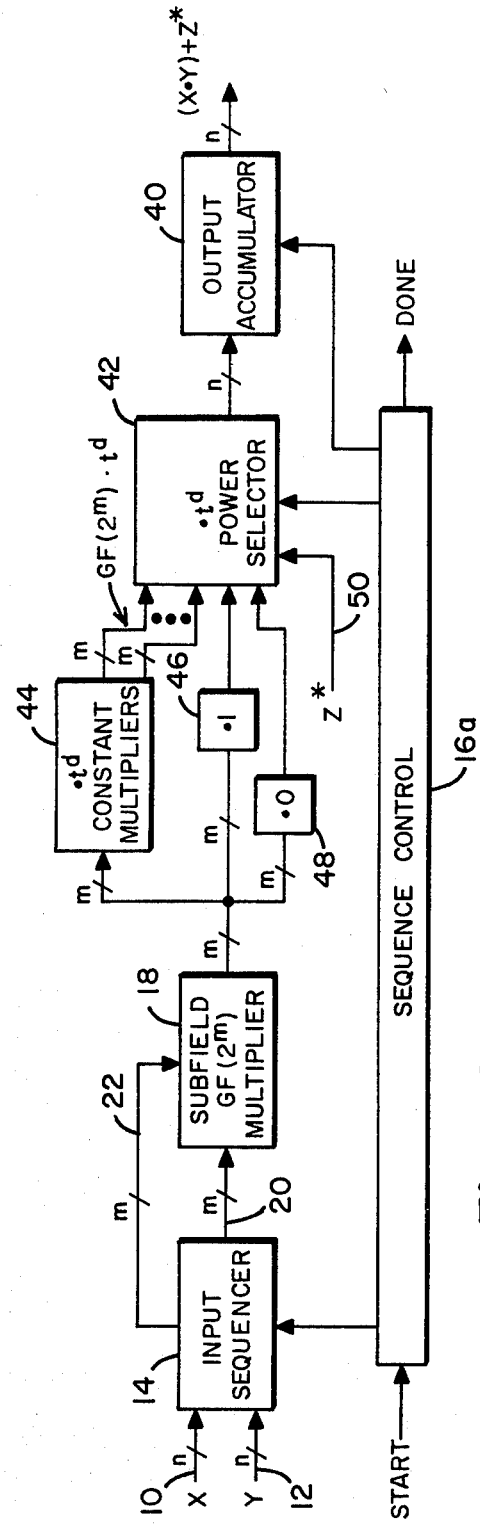

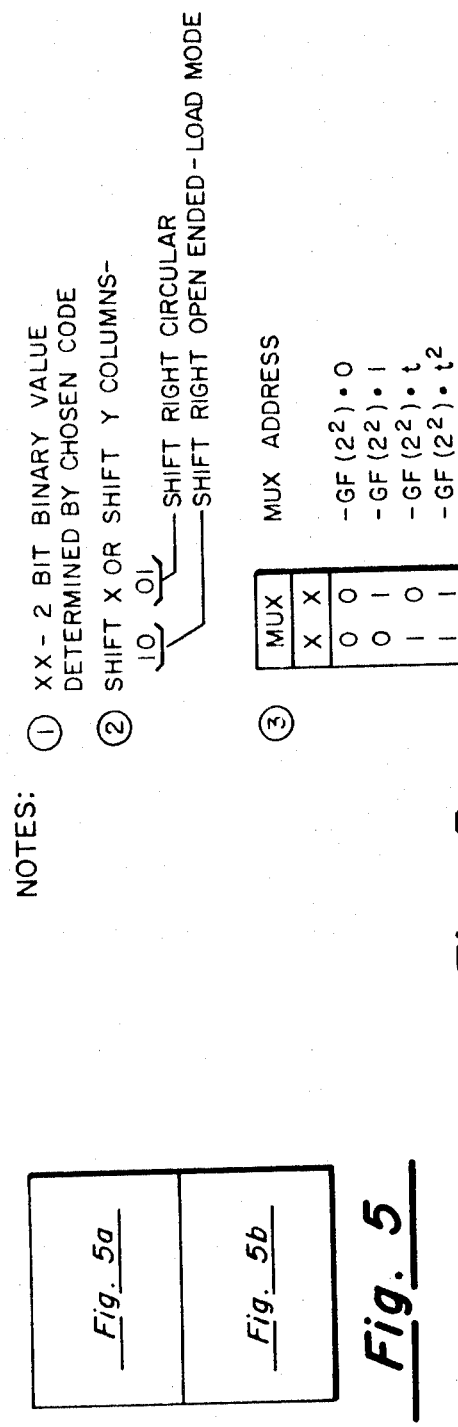
Fig. 5a
Fig. 5a | Fig. 5b
Fig. 5

Fig. 5b

| | | | | | | | | | | | | | | |
|---|---|---|---|---|---|---|---|---|---|---|---|---|---|---|
| | NEW $X_m$ | SUM | NEW $X_m$ | SUM | NEW $X_m$ | SUM | NEW $X_m,Y_m$ | SUM | NEW $X_m$ | SUM | NEW $X_m$ | SUM | NEW $X_m$ | DONE |
| | 0 | 1 | 0 | 1 | 0 | 1 | 0 | 1 | 0 | 1 | 0 | 1 | 0 | 1 | 0 |
| | xx | 00 | xx | 00 | xx | 00 | xx | 00 | xx | 00 | xx | 00 | xx | 00 | 00 |
| | xx | 00 | xx | 00 | xx | 00 | xx | 00 | xx | 00 | xx | 00 | xx | 00 | 00 |
| | xx | 00 | xx | 00 | xx | 00 | xx | 00 | xx | 00 | xx | 00 | xx | 00 | 00 |
| | xx | 00 | xx | 00 | xx | 00 | xx | 00 | xx | 00 | xx | 00 | xx | 00 | 00 |
| | 0 | 0 | 0 | 0 | 0 | 0 | 0 | 0 | 0 | 0 | 0 | 0 | 0 | 0 | 0 |
| | 00 | 00 | 00 | 00 | 00 | 01 | 01 | 00 | 00 | 00 | 00 | 00 | 00 | 00 | 00 |
| | 01 | 01 | 01 | 01 | 01 | 01 | 01 | 01 | 01 | 01 | 01 | 01 | 01 | 01 | 00 |
| | 26 | 27 | 28 | 29 | 30 | 31 | 32 | 33 | 34 | 35 | 36 | 37 | 38 | 39 | 40 |

| | | | | | | | | | | | | | | |
|---|---|---|---|---|---|---|---|---|---|---|---|---|---|---|
| | | FIRST $X_m \cdot Y_m$ | FIRST SUM | NEW $X_m$ | SUM | NEW $X_m$ | SUM | NEW $X_m$ | SUM | NEW $X_m,Y_m$ | SUM | NEW $X_m$ | SUM | NEW $X_m$ |
| 0 | 0 | 0 | 1 | 0 | 1 | 0 | 1 | 0 | 1 | 0 | 1 | 0 | 1 | 0 |
| 00 | 00 | xx | 00 | xx | 00 | xx | 00 | xx | 00 | xx | 00 | xx | 00 | xx |
| 00 | 00 | xx | 00 | xx | 00 | xx | 00 | xx | 00 | xx | 00 | xx | 00 | xx |
| 00 | 00 | xx | 00 | xx | 00 | xx | 00 | xx | 00 | xx | 00 | xx | 00 | xx |
| 00 | 00 | xx | 00 | xx | 00 | xx | 00 | xx | 00 | xx | 00 | xx | 00 | xx |
| 1 | 1 | 1 | 0 | 0 | 0 | 0 | 0 | 0 | 0 | 0 | 0 | 0 | 0 | 0 |
| 10 | 10 | 10 | 00 | 00 | 00 | 00 | 00 | 00 | 01 | 01 | 00 | 00 | 00 | 00 |
| 10 | 10 | 10 | 01 | 01 | 01 | 01 | 01 | 01 | 01 | 01 | 01 | 01 | 01 | 01 |
| 6 | 7 | 8 | 9 | 10 | 11 | 12 | 13 | 14 | 15 | 16 | 17 | 18 | 19 | 20 |

| COMPONENTS<br>MAJOR FUNCTIONS | (SN7408)<br>QUAD AND | (SN7486)<br>QUAD EX-OR | (SN74179)<br>4-BIT REGISTER | (SN74186)<br>PROM 64x8 | (SN74153)<br>DUAL 4/1 MUX | (SN74163)<br>4-BIT COUNTER |
|---|---|---|---|---|---|---|
| X REGISTER 58 | | | 2 | | | |
| Y REGISTER 60 | | | 2 | | | |
| SUBFIELD MULTIPLIER 56 | 1 | 1 | | | | |
| CONSTANT MULTIPLIERS 52, 54 | | 2 | | | | |
| MULTIPLEXER 90 | | | | | 4 | |
| ACCUMULATOR 62, 94 | | 2 | 2 | | | |
| CONTROL SEQUENCER 50, 74 | 1 | | | 2 | | 2 |
| SUBTOTALS | 2 | 5 | 6 | 2 | 4 | 2 |

TOTAL CHIPS = 21

*Fig. 6*

NOTE: THE ABOVE PARTS COUNT IS FOR STANDARD 14 OR 16 PIN DEVICES.

* ADD FOR LINEAR MODULE

| COMPONENTS \ MAJOR FUNCTIONS | (SN54179) 4-BIT REGISTER | (SN54153) DUAL 4/1 MUX | (SN54155) DUAL DECODER | (SN54163) 4-BIT COUNTER | (SN54S287) PROM 256x4 | (SN5486) QUAD EX-OR |
|---|---|---|---|---|---|---|
| X,Y REGISTERS 158, 160 | 8 | | | | | |
| SUBFIELD MULTIPLIER 162 | 1 | | | | 1 | |
| $X_m \cdot Y_m$ REGISTER 166 | | | | | | |
| SEQUENCE CONTROL PROMS 144, 146 | | | | | 2 | |
| $\cdot t^d$ PROM 170 | | | | | 1 | |
| GALOIS ADDER 176 | | | | | | 1 |
| REGISTER SELECT 154 | | 2 | | | | |
| OUTPUT REGISTER 178 | 4 | | | | | |
| SEQUENCE COUNTER 140 | | | | 2 | | |
| REGISTER DECODE 142 | | | 1 | | | |
| SUBTOTALS | 13 | 2 | 1 | 2 | 4 | 1 |

TOTAL CHIP COUNT = 23

*Fig. 10*

SEQUENTIAL GALOIS MULTIPLICATION IN GF($2^n$) WITH GF($2^m$) GALOIS MULTIPLICATION GATES

The invention described herein was made in the course of, or under, a contract with the Department of the Navy.

BACKGROUND OF THE INVENTION

The present invention relates to the field of logic design as particularly directed toward its implementation in digital computers using binary logic. More particularly, the present invention is directed toward the implementation of Galois logic using binary logic devices that operate according to well-known Boolean algebra.

Galois theory includes the study of finite fields first considered by the 19th Century French mathematician E. Galois. Since 1948, Galois theory has been applied widely to communication theory where it has led to efficient error-correcting codes. In 1969, in the publication "A Transform for Logic Networks," IEEE Transactions on Computers, Volume C-18, No. 3, March, 1969, K. S. Menger, Jr., established a theorem making the use of the Galois theory applicable to network synthesis. Somewhat later, in 1971, in the publication "A Cellular-Array Multiplier for GF($2^m$)," B. A. Laws, Jr., et al, IEEE Transactions on Computers, December, 1971, Pages 1573-1578, there are discussed circuits for calculating the product of two elements of the Galois field GF($2^m$) using combinatorial logic.

In Publication I, "Galois Logic Design," J. T. Ellison, et al, AFCRL-70-0583, obtainable from Data Sciences Laboratory, Air Force Cambridge Research Laboratories, Air Force Systems Command, United States Air Force, Bedford, Massachusetts, 01730, there is disclosed a generalized method for the construction of GF($2^n$) Galois multipliers, or multiplication gates, using GF($2^1$) Galois multipliers, i.e., two-input AND gates, and an Exclusive-OR network for each of the n outputs. This Galois GF($2^n$) multiplication gate generates the Galois product $$X \cdot Y = (X \cdot Y)_0, \ldots, (X \cdot Y)_{n-1}$$

from the Galois input on n, X input lines $$X_0, \ldots, X_{n-1}$$

and from the Galois input on n, Y input lines $$Y_0, \ldots, Y_{n-1}.$$

In the J. T. Ellison Pat. No. 3,805,037 the Galois multiplication gate is converted into a Galois linear gate by the addition of n, Z input lines, each one coupled by a two-input Exclusive-OR gate, to an associated one of an n-output Exclusive-OR network or gate. It is to be appreciated that k-input Exclusive-OR gates, where k is a positive integer of 3 or greater, are synonymous to k-input parity gates, and may be comprised of the number (k−1) of two-input Exclusive-OR gates—see the text "Digital Design," Wiley, Interscience, 1971, R. K. Richards, Pages 198-200.

In Publication II, "Sequential Galois Multipliers," J. M. Marver, Report No. PX 12344, August, 1977, prepared under Contract No. N00014-77-C-0192, with the Office of Naval Research, there has been proposed the construction of Galois multiplication gates having the Galois field GF($2^n$) from Galois multiplication gates having the Galois field GF($2^m$) where m is a positive integral divisor of n, i.e., k=(n/m). For example, using this proposed technique, it is possible to generate Galois multiplication gates for the Galois field GF($2^8$) from Galois multiplication gates for the Galois fields GF($2^1$), GF($2^2$) or GF($2^4$).

SUMMARY OF THE INVENTION

The present invention is directed toward a method of and an apparatus for performing the Galois multiplication operation GF($2^n$) with GF($2^m$) Galois multiplication gates or multipliers, where m is a positive integral divisor of n, e.g., n=8 and m=2 and so k=(n/m)=4. The individual Galois multipliers are similar to those of Publication I or of the J. T. Ellison Pat. No. 3,805,037 in which the n, X input lines and the n, Y input lines form $n^2$ intersections. The $n^2$ intersections are, in turn, intercoupled by $n^2$ AND gates, the outputs of which, at an n-output Exclusive-OR network, produce the Galois product X·Y. The Galois multiplication operation in a single GF($2^n$) Galois multiplier, where, e.g., n is equal to or greater than 16, requires complex internal constructions that are difficult to implement in known MSI and LSI processes. However, it has been found that the complexity of the required Galois multipliers may be substantially reduced by performing the Galois multiplication operation using a less complex GF($2^m$) Galois multiplier in a sequential manner. That is, it is possible to perform the same Galois multiplication of GF($2^n$) with a single GF($2^m$) Galois multiplier, where m is a positive integral divisor of n, i.e., k=n/m. This reduction to the relative simplicity of an individual GF($2^m$) Galois multiplier provides a substantial reduction in the complexity of the overall GF($2^n$) Galois multiplier, where the multiplication over GF($2^n$) is done in a sequential mode.

BRIEF DESCRIPTION OF THE DRAWINGS

FIG. 1 is a first block diagram of a GF($2^n$) multiplier constructed from a single GF($2^m$) multiplier of a suitable code.

FIG. 2 is a second block diagram of a GF($2^n$) multiplier constructed from a single GF($2^m$) multiplier of a suitable code.

FIG. 5, which consists of FIGS. 5a and 5b, is a table of the control PROM program for the embodiment of FIG. 3.

FIG. 6 is a table of the MSI semiconductor components for the embodiment of FIG. 3.

FIG. 10 is a table of the MSI semiconductor components for the embodiment of FIG. 8.

DESCRIPTION OF THE PREFERRED EMBODIMENTS

Figure 3:
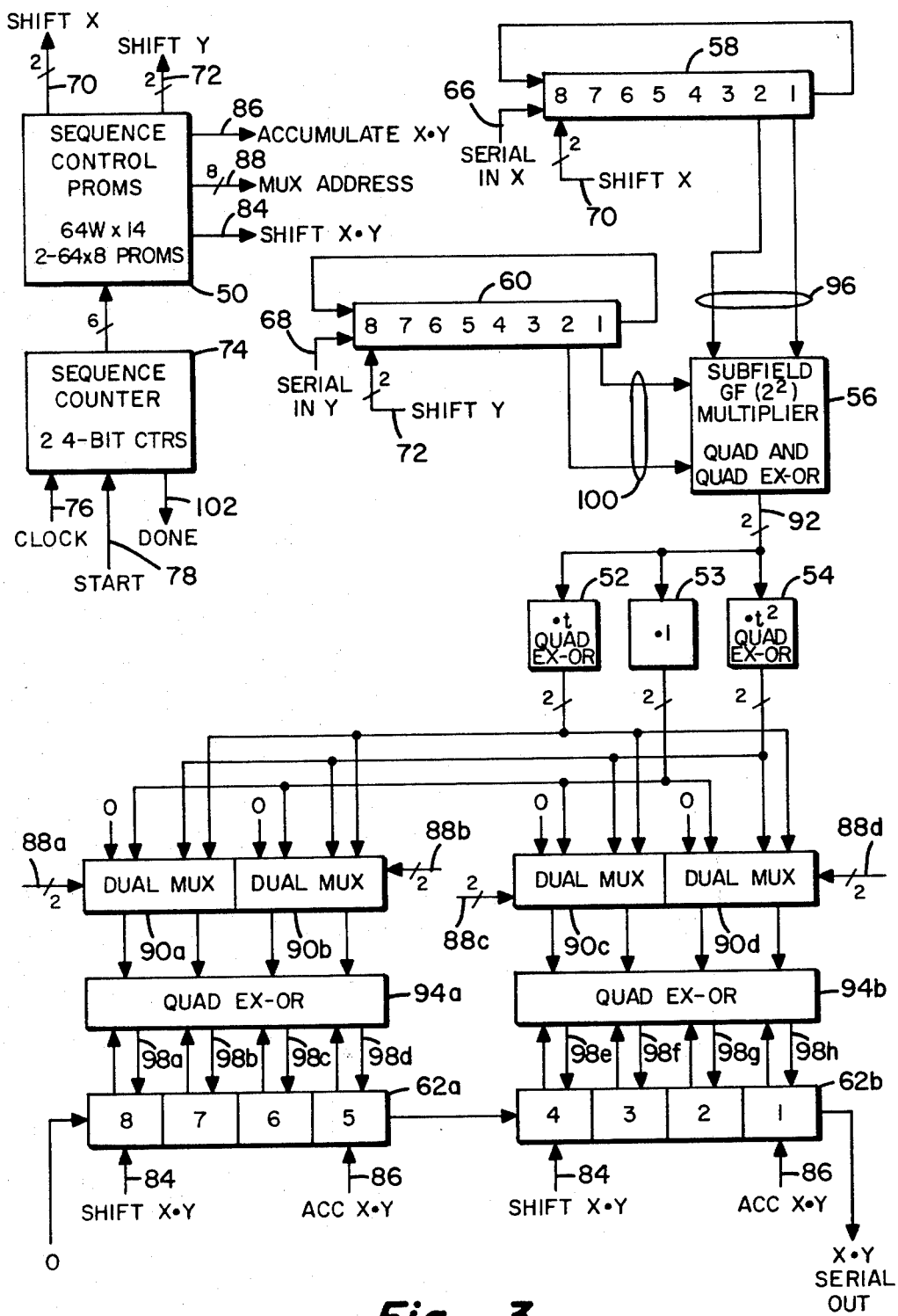
FIG. 3 is an illustration of a first implementation of a GF($2^n$) multiplier constructed from a single GF($2^m$) multiplier of a suitable code.

In the present invention, a $GF(2^n)$ Galois multiplier is constructed on implemented using a single $GF(2^m)$ Galois multiplier, where m is a positive integral divisor of n greater than 1, i.e., k=n/m as where n=16 and m=2, 4 or 8. In general in the present invention, all $k^2$ pairs of the k m-bit factors or portions of the n-bit inputs to the $GF(2^n)$ Galois multiplier are sequentially coupled to a subfield $GF(2^m)$ Galois multiplier of a suitable code. As an example, the k m-bit portions of $$X = X_0, X_1, \ldots, X_{n-1}$$

are $$X_0, \ldots, X_{m-1}; X_m, \ldots, X_{2m-1}; \ldots;$$

$$X_{(k-1)m}, \ldots, X_{km-1}.$$

The resulting $k^2$ m-bit outputs, of the subfield $GF(2^m)$ Galois multiplier, that result from each sequential multiplication of each pair of m-bit inputs are combined in a summing network to produce the final n-bit output.

In the prior art, as in Publication II, it has been shown that Galois field extensions from $GF(2^1)$ to $GF(2^2)$, from $GF(2^2)$ to $GF(2^4)$, and from $GF(2^4)$ to $GF(2^8)$ are extensions of degree 2 and are primitive polynomials of degree 2 to go from the smaller field to the larger field. It has been shown in Publication II that a primitive polynomial of degree 4 is required to generate the field $GF(2^8)$ from the field $GF(2^2)$. The computation of this primitive polynomial can be done by multiplying the primitive polynomial $x^2+x+t$ over the field $GF(2^4)$ by its conjugate polynomial $x^2+x+t^4$ [with respect to $GF(2^2)$]. The resulting primitive polynomial over $GF(2^2)$ is $x^4+t^2x^2+tx+t$. In the same manner as was taught in Publication II to construct a $GF(2^m)$ multiplier with $GF(2^{m/2})$ multipliers, it is possible to construct a $GF(2^8)$ multiplier with $GF(2^2)$ multipliers.

With particular reference to FIG. 1 there is presented a block diagram of a $GF(2^n)$ multiplier from a single $GF(2^m)$ multiplier of a suitable code. Here the n-bit inputs on input line 10 and on Y input line 12 are coupled to input sequencer 14, which under control of sequence control 16 sequentially couples m-bit portions of the X and Y n-bit inputs into subfield $GF(2^m)$ multiplier 18 via lines 20 and 22. The sequential $k^2$ outputs from subfield $GF(2^m)$ multiplier 18 are, via line 24, coupled to subfield store 26, which sequentially stores the m-bit outputs or subfield products of subfield multiplier 18. After the subfield products are accumulated in subfield store 26, a logic network 28, whose form is a function of the particular code used in subfield multiplier 18, sums, via line 30, the various combinations of subfield products and constant multipliers to provide on line 32 the n-bit Galois product X·Y. If Z input lines 34 are included in the final accumulation, a Galois linear module is implemented which has the output (X·Y)+Z.

In an example where n=8 and m=4, 8-bit X and Y inputs on lines 10 and 12, respectively, are coupled to input sequencer 14. Input sequencer 14, under control of sequence control 16, sequentially couples the four possible combinations of pairs of 4-bit X and Y portions, or half-words, of the 8-bit X and Y inputs on lines 10 and 12, to lines 20 and 22 which at multiplier 18 are outputted as 4-bit subfield products on line 24. Multiplier 18 is a $GF(2^4)$ multiplier as taught in Publication I.

Subfield store 26, under control of sequence control 16, sequentially stores the sequential four 4-bit subfield products from line 24 in four 4-bit binary registers. After the four 4-bit subfield products are accumulated in subfield store 26, logic network 28, which includes an Exclusive-OR network such as taught in the J. T. Ellison U.S. Pat. No. 3,805,037, and a constant multiplier such as taught in the text "Algebraic Coding Theory," E. R. Berlekamp, McGraw-Hill, 1968, Pages 44-46, sums the various combinations of subfield products and constant multiplies to generate on line 32 the 8-bit Galois $GF(2^8)$ product X·Y.

In the above particular example, i.e., where n=8 and m=4, only one t constant multiplier is required [t is a primitive element of the Galois field $GF(2^4)$]. This constant multiplier is a simple combination of Exclusive-ORs, the particular combination of which depends upon the code that was used to construct the $GF(2^4)$ multiplier—see the hereinabove referenced Berlekamp text. However, where the ratio n/m is greater than 2, more than one constant multiplier is required. Also, the amount of storage required for the subfield outputs of the $GF(2^m)$ multiplier increases rapidly as a function of $(n/m)^2$.

Galois theory shows that m-bit portions of the subfield outputs of the $GF(2^m)$ multiplier can be accumulated simultaneously by sequential Galois adds (bit-wise Exclusive-ORs) to the previous accumulated sum of either subfield outputs or of the subfield outputs multiplied by a specific power of a primitive element as required by the chosen code. The same Galois theory shows that each subfield output multiplied by a specific element is entered only once into the final sum for any m-bit portion of the output word. These facts lead to the improved basic configuration in FIG. 2 which requires storage only in the output accumulator 40. This configuration may also be used where (n/m)=2. For each of the $(n/m)^2$ steps in the sequence, power selector 42 selects the constant multiple of $GF(2^m)$, from the $\cdot t^d$ constant multipliers 44, that is to be added to each m-bit portion of the accumulated output according to the multiply matrices for the particular selected code. These constant multiplies can be derived from the primitive polynomial that defines the selected code. For example, a primitive polynomial for a $GF(2^8)$ multiplier constructed with a $GF(2^4)$ multiplier is $$p(x) = x^2 + x + t$$

and the corresponding multiply output matrices for each 4-bit portion of the output word are:

$$M_1^{8,4} = \begin{bmatrix} 1 & 0 \\ 0 & t \end{bmatrix} \text{ and } M_2^{8,4} = \begin{bmatrix} 0 & 1 \\ 1 & 1 \end{bmatrix}$$

From $M_1^{8,4}$ $$(XY)_1 = 1 \cdot GF(2^4)_{1,1} + 0 \cdot GF(2^4)_{1,2} + 0 \cdot GF(2^4)_{2,1} + t \cdot GF(2^4)_{2,2}$$

and from $M_2^{8,4}$ $$(XY)_2 = 0 \cdot GF(2^4)_{1,1} + 1 \cdot GF(2^4)_{1,2} + 1 \cdot GF(2^4)_{2,1} + 1 \cdot GF(2^4)_{2,2}$$

where · and + mean Galois multiply and add, respectively. Therefore, for multiplication of two $GF(2^8)$ elements with a GF($2^4$) multiplier, one needs only a constant ·$t^1$ multiplier.

A linear module results if $Z_1$ and $Z_2$ additive terms are added to $(XY)_1$ and $(XY)_2$, respectively. This is easily accomplished as indicated in FIG. 2 by addition of a Z input line 50 to the power selector 42 which is selected and accumulated into output accumulate 40 on an extra final step of sequence control 16a.

In general, the outputs of the subfield GF($2^m$) multiplier are coupled in parallel to a maximum number of $2^m$ constant multipliers, representing the $2^m-1$ (powers of t) constant multipliers and the 0 (zero) multiplier. That is, where a GF($2^n$) multiplier is to be constructed using a single GF($2^m$) multiplier, the outputs of the subfield GF($2^m$) multiplier are coupled in parallel to a maximum of each of $$t^{2m-2} \ldots t^2, t^1, 1, 0$$

constant multipliers. Thus, in FIG. 2 where, e.g., m=2, the maximum number of constant multipliers would be 4:

$$t^2, t^1, 1, 0.$$

Note that only ·$t^2$ and ·$t^1$ multiplies involve a non-trivial multiplication. Note that a multiplication by ·1, 46, is simply a direct path from the GF($2^m$) subfield multiplier to the power selector and that a multiplication by ·0, 48, is an input of m binary 0's to the power selector. The boxes 46 and 48 are shown explicitly in FIG. 2 for generality and uniformity. For an arbitrary n, the power selector has at most $2^m$ inputs for a multiplication gate. For m>2 the actual number of inputs is usually much less than $2^m$ so that little or no extra hardware is required to provide the Z input needed to construct a linear module from a multiplication gate.

The first embodiment of the present invention is illustrated, by example, for a GF($2^8$) Galois multiply over GF($2^2$) as shown in FIG. 3. This embodiment is general in the sense that any suitable Galois code in GF($2^8$) may be implemented with this embodiment. The exact information encoded into the sequence control PROM 50, the number of Exclusive-ORs required for ·$t^1$ and ·$t^2$ constant multipliers 52 and 54 and the internal connections of the GF($2^2$) subfield multipliers 56 are a function of the chosen Galois code.

Figure 4:
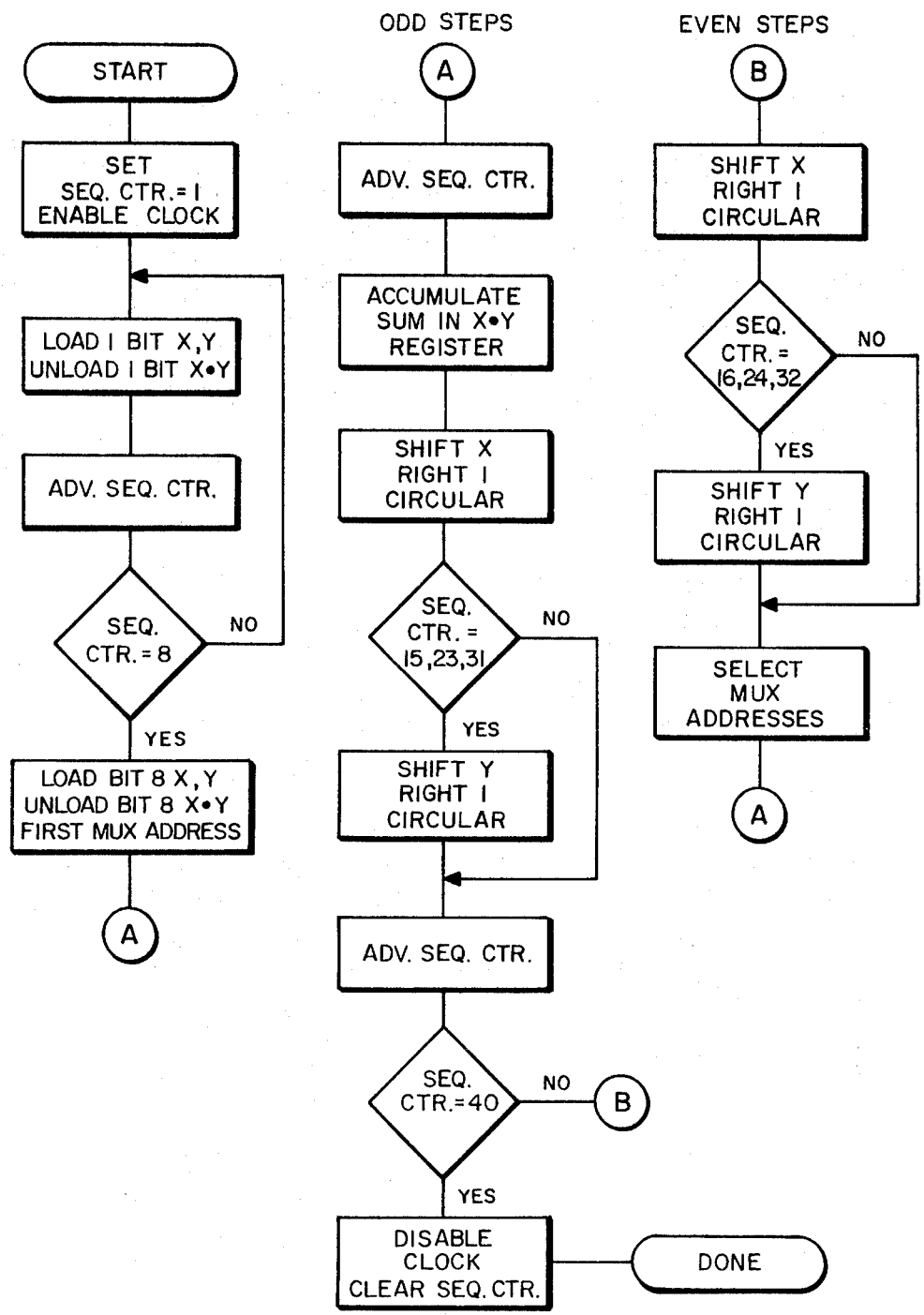
FIG. 4 is a flow diagram for a GF($2^8$) multiply implemented by the embodiment of FIG. 3.

The flow diagram for the following sequence of events is shown in FIG. 4. The content of sequence control PROM 50 is detailed in FIG. 5 except for code dependent MUX control bits.

For this embodiment, a serial means of loading input data registers 58 and 60 and of unloading output data register 62 are shown. For an LSI implementation, serial input/output data transfers, as in FIG. 3, conserve pins; however, either serial or parallel data transfers can be used. The serial 8-bit shift registers 58 and 60 are loaded, via X input line 66 and Y input line 68, under control of one of the two Shift X signals and one of the two Shift Y signals on the control lines in each pair of lines in cables 70 and 72, that are generated by sequence control PROM 50. These lines enable and right shift input data one X bit position or one Y bit position per step of the sequence counter 74, at a rate determined by the Clock signal on line 76 when initiated by a Start signal on line 78. The Start signal also clears sequence counter 74 to the first PROM address of sequence control PROM 50. Each bit in the sequence control PROM 50 14-bit output word corresponds to one of the 14 control lines in FIG. 3, i.e., 2 lines in Shift X cable 70, 2 lines in Shift Y cable 72, 1 line of Shift X·Y line 84, 1 line of Accumulate X·Y line 86, and the 8 lines of MUX address cable 88. Active lines are coded, i.e., effected, with a stored "1" and inactive lines are coded with a stored "0" in the sequence control PROM 50 14-bit output word for each step in the load-multiply sequence. During the Load cycle the only other bit active on the associated line is on line 84, Shift X·Y, which performs an Unload of the results from a previous multiply and for Step 8 as described in the next paragraph. Thus, the transmission of the output of one Galois multiplier to the input of another can take place in synchronism.

After 8 steps of sequence counter 74, the first pair of two-bit subfield values from stages 1 and 2 of shift registers 58 and 60 are coupled to subfield multiplier 56, which consists of four two-input AND gates and three Exclusive-OR gates connected according to the chosen code. The two-bit subfield value is applied in parallel to the ·0, ·1, ·t and ·$t^2$ constant multipliers. For the codes usually chosen the result of the ·0 constant multiplier is binary zero in all bit positions and is thus illustrated as a 0 coupled to the respective inputs of the four dual multiplexers 90 and the result of the ·1 constant multiplier 53 is the multiplicand itself. Therefore, only the ·t constant multiplier 52 and the ·$t^2$ constant multiplier 54 require logic to implement. Either function may always be realized with at most one Exclusive-OR gate. The three two-bit outputs of the constant multipliers 52, 53 and 54, plus the zero input ·0, are applied simultaneously to the four inputs of each of four 4-to-1 dual multiplexers 90. Each dual multiplexer 90 is controlled by active signals or "1" bits on two of the 8 control lines of MUX address cable 88 to select the multiple of the subfield multiplier 56 output on cable 92, as required by the output multiply matrix for each two-bit portion of the product. The sequence control PROM 50 output word for the eighth step will also contain the proper multiplexer addresses for the first of 16 subfield multiplies GF($2^2$)$_{i,j}$.

During the eight-step load cycle, output register 62 had been set to all "0's" by shifting binary "0's" as the previous output was unloaded under control of the Shift X·Y signal on line 84: the Accumulate X·Y signal on line 86 was inactive during those eight steps. Hence, after the first eight steps, the eight Exclusive-ORs 94 have as one input all "0's" and as the other input the output of each dual multiplexer 90.

On each of the odd numbered steps 9–39 of sequence counter 74, the following actions occur under control of appropriate "1" bits in the 14-bit output word of sequence control PROM 50. The leading edge of the Accumulate X·Y "1" bit or active signal on line 86 causes the Galois sum (Exclusive-OR) of the previous content of output register 62 and of the proper multiples of subfield multiplier 56, as represented by the four dual multiplexer 90 outputs, to be returned as the new value of output register 62. The Shift X signal on cable 70 and Shift Y signal on cable 82 input control lines are, at this time, "0" bits or inactive signals. The second Shift X signal causes one end-around right shift of the X input register 58 for each step of sequence counter 74. Also, for the odd numbered steps 15, 23 and 31, the Y input register 60 is shifted one place to the right. The shift need not be end-around but is so shown for logic consistency.

On each of the even numbered steps 10-38 of sequence counter 74, the sequence control PROM 50 output words cause the following actions. The end-around shift control line of the Shift X signal cable 80 causes an additional right shift of the X input register 58 bringing the next two-bit portion of the X input data into stages 1 and 2 and hence into the X input cable 96 of subfield multiplier 56. Also, at each even numbered step a new set of 8-bit multiplexer addresses on cable 88, according to the multiply matrices for the chosen code, selects the appropriate multiple of the subfield multiplier 56 output on cable 92 to form the new partial product on the quad Exclusive-OR output lines 98 ready to be loaded into the output register 62 on the next odd numbered step. On even numbered steps 16, 24 and 32, Y input register 60 is also shifted right an additional bit position to bring the next two-bit portion of the Y input data into stages 1 and 2 and hence into the Y input cable 100 of subfield multiplier 56.

On step 40 of sequence counter 74 the Done signal on line 102 is brought high to a "1" bit to indicate completion of the $GF(2^8)$ Galois multiply. Further steps of sequence counter 74 are inhibited until the next Start signal is coupled to line 76.

The net result of the above steps 1 through 40 is to load/unload the input data registers 58, 60, form sixteen pairs of two-bit subfield values, form sixteen subfield multiplies and appropriate constant multiplies and accumulate the running sum in the output register 62 ready for unloading on the next cycle or under separate unload control if desired.

A maximum Small/Medium Scale Integration logic module complement would consist of the parts listed in FIG. 6 in the technology of the designer's choice. Part numbers in parenthesis are representative TTL components.

Figure 7:
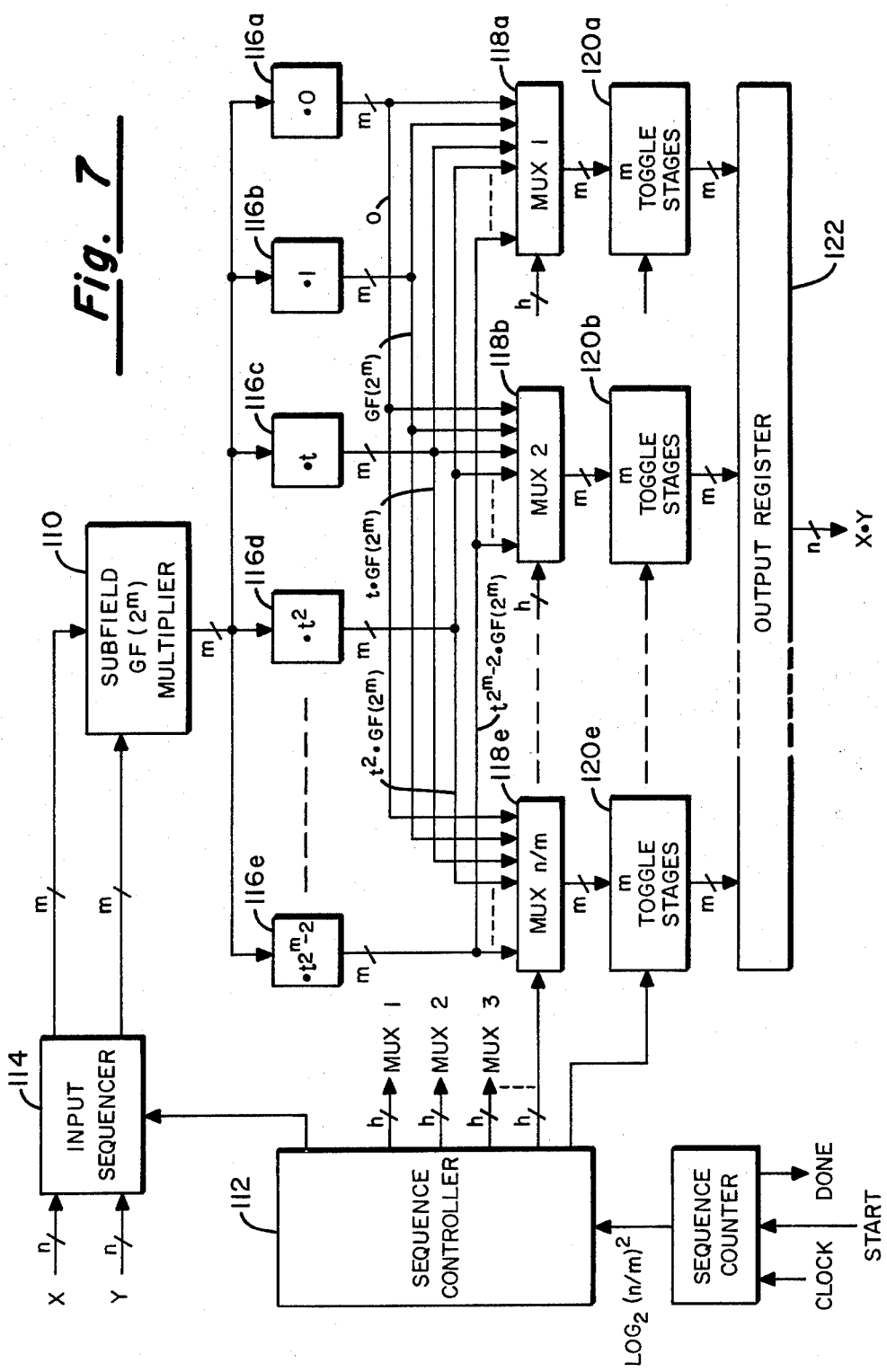
FIG. 7 is an illustration of a second implementation of a GF($2^n$) multiplier constructed from a single GF($2^m$) multiplier of a suitable code.

It should be understood that the specific implementation of FIG. 3 may be generalized in a number of respects. FIG. 7 shows the general structure for an n-bit Galois multiply using an m-bit subfield multiplier 110.

The sequence controller 112 could consist of random combinatorial logic, programmable logic arrays (PLA), programmable array logic (PAL), ROM, or, as in FIG. 3, a PROM.

The input sequencer 114 consists of means to store X and Y inputs if X and Y are not stable during the multiply operation. If the X and Y inputs are outputs of similar multiply gates such as the one in FIG. 7, X and Y will be stable and input sequencer 114 need only consist of a means to select all $k^2$ pairs of m-bit segments of X ($X_m$) and Y ($Y_m$) to apply to the subfield $GF(2^m)$ multiplier 110. Subfield multiplier 110 may consist of a logic network of ANDs and Exclusive-ORs as in FIG. 3 or may be implemented with a ROM (Read Only Memory), a PROM (Programmable Read Only Memory) or an EAROM (Electrically Alterable Read Only Memory). In the case of memory implementations, $X_m$ and $Y_m$ are concatenated to form a 2m-bit address for the subfield multiplier memory 110 and each m-bit output data word is coded with the $X_m$ and $Y_m$ multiply table for the chosen code.

Constant multipliers 116 for multiplication by powers of the primitive element t in the selected code, may also be implemented by arrays of Exclusive-OR gates, by a small ROM, PROM or EAROM, or by time-sharing one ROM, PROM or EAROM as will be demonstrated. In general, not all multipliers, $\cdot t^d$, are required; but are determined by a specific code. Therefore, if the number of multiplexer inputs equals $2^m$ (m=h) there will usually be spare multiplexer inputs to allow simple construction of a linear module—see the J. T. Ellison U.S. Pat. No. 3,805,037.

Multiplexer 118 consists of n/m separate means to select the appropriate $\cdot t^d$ to sum into each m-bit portion of the Galois product of X·Y. A convenient means when constant multipliers are separate elements is an MSI $2^h$-to-1 digital multiplexer. With PROM constant multipliers the means consists of proper sequencing of ROM (PROM) addresses. Toggle stages 120 perform Galois sums of new subfield products with previous results, thereby accumulating the Galois sum of products which represent the m-bit multiply matrices for each m-bit output word. Various means of implementation are Exclusive-OR/Register networks as in FIG. 3 or JK toggle flip-flop stages as in FIG. 7. Output register 122 allows transfer of the final product, X·Y, contained in the toggle stages 120 after the last accumulation of the last subfield multiply in order to hold the X·Y product stable for input to subsequent operations.

Figure 8:
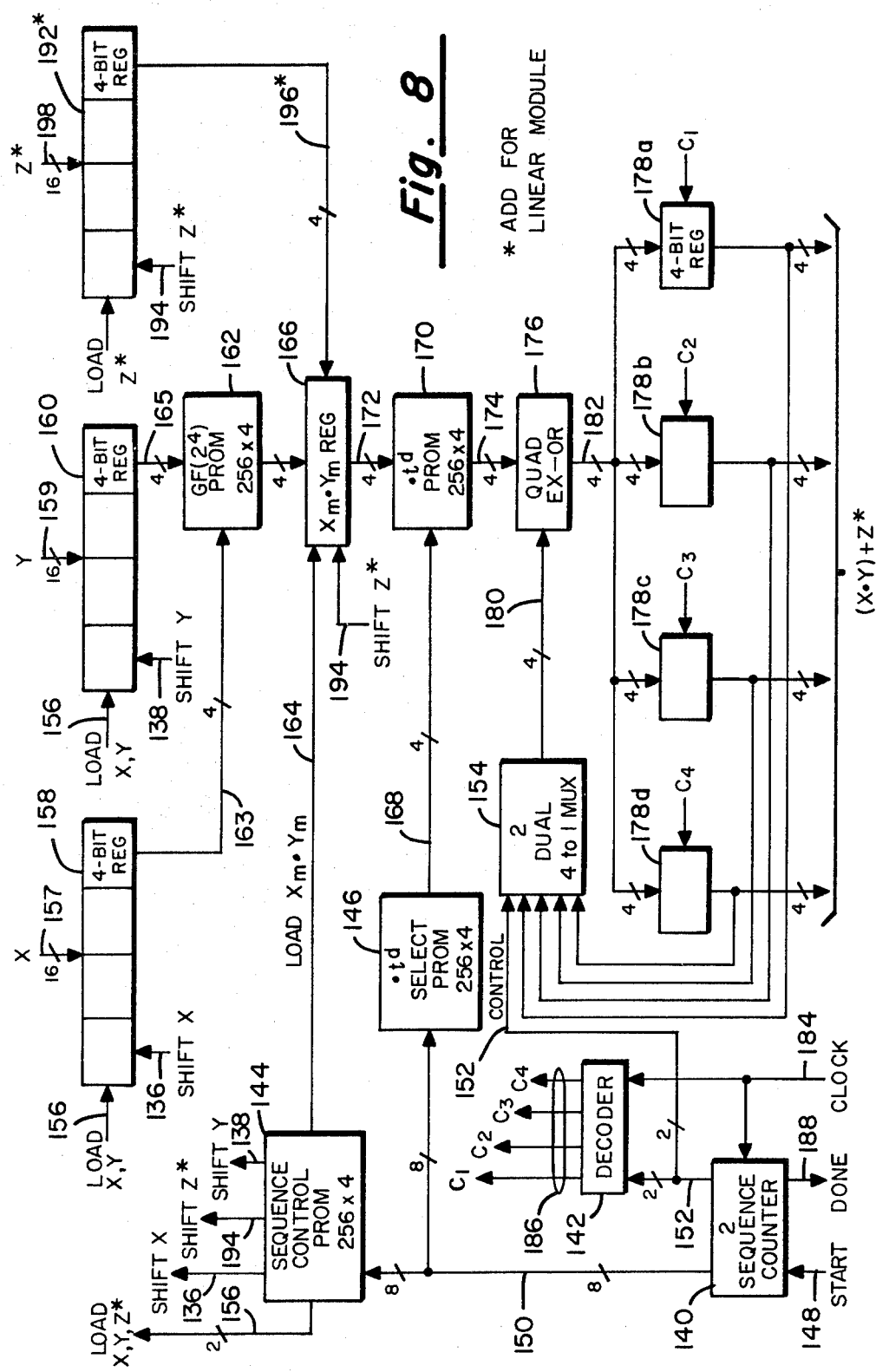
FIG. 8 is an illustration of a third implementation of a GF($2^{16}$) multiplier using a PROM as the GF($2^4$) multiplier.
Figure 9:
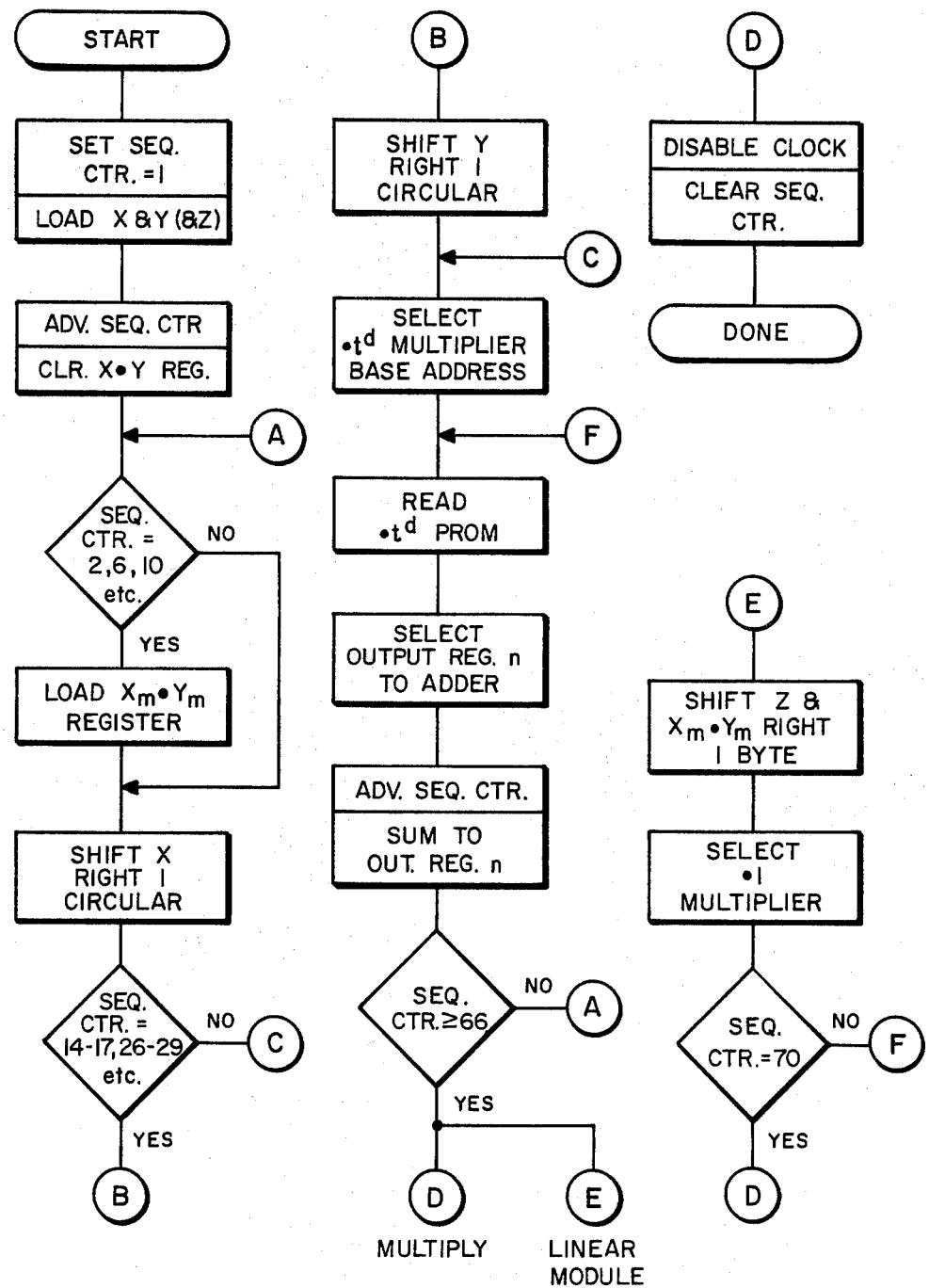
FIG. 9 is a flow diagram for the GF($2^{16}$) multiply implemented by the embodiment of FIG. 8.

To demonstrate a further practical implementation of the present invention, a PROM implementation for a Galois multiply of 16-bit data words will be described. Refer to FIG. 8 and FIG. 9 for the block diagram and flow diagram, respectively, of a $GF(2^{16})$ multiply over $GF(2^4)$. For this implementation four distinct means of sequence control are utilized: sequence counter 140; decoder 142; sequence control PROM 144, and $\cdot t^d$ select PROM 146. These and all other components are standard, readily available MSI semiconductor components.

Previous to the coupling of the Start signal to line 148, sequence control PROM 144, and $\cdot t^d$ select PROM 146 outputs are all "0's." Upon the coupling of the Start signal to a "1" bit, to line 148, sequence counter 140 is set to a "1" and the Clock signal on line 184 is enabled by the Start signal. The 8-bit sequence counter (140) output word on cable 150 is coupled to sequence control PROM 144 and $\cdot t^d$ select PROM 146 address inputs, and the lower order two bits, via cable 152, are coupled to decoder 142 and multiplexer 154. Address number one of the sequence control PROM 144 has a Load X, Y signal, a "1" bit, coupled to cable 156 causing a new X data word on cable 157 and a new Y data word on cable 159 to be parallel loaded into X input register 158 and Y input register 160, respectively. Each register consists of four 4-bit shift registers. The rightmost 4-bit byte of X input register 158, via cable 163, and Y input register 160, via cable 165, are concatenated to form the address for a 256 word by 4-bit subfield $GF(2^4)$ multiplier PROM 162. The next step of the sequence control PROM 144 and every fourth step thereafter, causes the Load $X_m \cdot Y_m$ signal, a "1" bit on line 164, to load the 4-bit byte output of subfield multiplier 162 into $X_m \cdot Y_m$ register 166. $X_m \cdot Y_m$ are held constant during the intervening three right 1-bit circular shifts of X input register 158 and (after every 12 shifts of X) of Y input register 160. Therefore, $X_m \cdot Y_m$ is stable for four sequential multiplies by selected $\cdot t^d$ constants in synchronism with X shifts and Y shifts.

For each step of sequence counter 140, the $\cdot t^d$ Select signals on cable 168 at $\cdot t^d$ PROM 170 choose the constant multiply appropriate to the subfield multiply in process and in accord with which of the four 4-bit output sums is being accumulated, starting at the low-ordered four bits. The $\cdot t^d$ Select signals on cable 168 are concatenated with the $X_m \cdot Y_m$ register output on cable 172 to select one GF($2^4$)·$t^d$ output code, which via cable 174 is applied to one input of quad Exclusive-OR 176. At the same time, the lower-ordered two bits of the output of sequence counter 140, via cable 152, control four 4-to-1 multiplexers 154 to select one 4-bit byte or portion of output register 178 and couple it to the second input, via cable 180, of the quad Exclusive-OR 176. As a result, the Galois sum is formed at the output of quad Exclusive-OR 176 and, via cable 182, is accumulated into one of the four 4-bit portions of output register 178 on the next sequence step. Decoder 142 decodes the lower-ordered two bits of the output of sequence counter 140 on cable 152 and when enabled by a Clock signal on line 184 produces a Register Load signal "1" bit on one of the control lines C1–C4 of cable 186 corresponding to the 4-bit portion of output register 176 that was selected on the previous step to accumulate a new partial product.

The above sequence is repeated 16×4=64 times (Steps 2–65). Every fourth four-step sequence includes four right shifts of the Y input register 160. Sixteen four-step sequences form all 16 subfield multiplies and accumulate the partial products. On step 66 the final sub-product is accumulated, the Clock signal on line 184 is disabled, sequence counter 140 is reset to step $\phi$ and the Done signal on line 188 is issued.

The chip complement for a TTL implementation of a GF($2^{16}$) multiply gate is illustrated in FIG. 10. Interestingly, due to the higher level of integration and parallel input/output transfers, the GF($2^{16}$) implementation requires only two more chips and only 65% more sequence steps than the GF($2^8$) implementation.

A VLSI implementation of the embodiment of FIG. 8 is easily feasible on a single chip. The addition (shown dotted) of four 4-bit registers (Z input register 192) with tri-stated outputs to FIG. 8, programming one bit column of a second sequence control PROM 144 (Shift Z 194), adding four steps to the sequence control program stored in sequence PROMS 140, 144 and adding four steps to sequence counter 140 implements a GF($2^{16}$) Galois linear module. Sequence E in FIG. 9 flow diagram shows the added four steps.

The following describes the linear module operation. The Z input register 192 consists of four 4-bit bytes, each with a parallel load input controlled by Load X, Y, Z signal on line 156 and a parallel byte-shift input controlled by a Shift Z signal on line 194. $X_m \cdot Y_m$ register 166 must also have a parallel byte shift input, via cable 196, from the rightmost 4-bit byte of Z register 192. The output of each byte of Z input register 192 is coupled to the input of the byte on its right as in registers 158, 160. The Z input on cable 198 is assumed to be tri-state high impedance during byte shifts.

Instead of terminating on step 66, the rightmost byte of Z input register 192 is shifted into $X_m \cdot Y_m$ register 166. For steps 66–70 the ·$t^d$ select PROM 146 selects a ·1 constant multiply. At the same time MUX 154 selects the rightmost byte of the accumulated product X·Y stored in output register 178. The Galois sum on cable 182 is clocked by the Register Load signal C1 on cable 186. On the next step, 67, while the next pair of bytes, from Z input register 192, and from the product X·Y are summed. The same operation is repeated on steps 68 (C2) and 69 (C3) with the final result clocked by the Register Load signal C4 on cable 186 at output register 178d on step 70 at which time the Done signal on line 188 is issued and a linear module cycle is complete.

What is claimed is:

1. A Galois GF($2^n$) multiplication gate for performing the Galois multiplication in the Galois field GF($2^n$) which Galois GF($2^n$) multiplication gate generates the Galois product $X \cdot Y = (X \cdot Y)_0, \ldots, (X \cdot Y)_{n-1}$ from the Galois input on n, X input lines $$X_0, \ldots, X_{n-1}$$

and from the Galois input on n, Y input lines
$$Y_0, \ldots, Y_{n-1}$$

comprising:
a single GF($2^m$) Galois multiplication gate having the Galois subfield GF($2^m$) where m is a positive integral divisor of n having the relationship of k=n/m, where k is a positive integer greater than 1, k>1, which single GF($2^m$) Galois multiplication gate generates $k^2$ subfield GF($2^m$) Galois partial products;

input sequencer means receiving said X and Y n-bit inputs and sequential coupling k m-bit portions of each of said X and Y n-bit inputs to said single GF($2^m$) Galois multiplication gate for enabling said single GF($2^m$) Galois multiplication gate to sequentially generate said $k^2$ subfield GF($2^m$) Galois partial products therefrom; and, means including constant multiplier means, responsively coupled to said single GF($2^m$) Galois multiplication gate and sequentially accumulating said sequentially generated $k^2$ subfield GF($2^m$) products for providing on n output lines the n-bit Galois product X·Y.

2. A Galois GF($2^n$) multiplication gate for performing the Galois multiplication in the Galois field GF($2^n$) which Galois GF($2^n$) multiplication gate generates the Galois product $X \cdot Y = (X \cdot Y)_0, \ldots, (X \cdot Y)_{n-1}$ from the Galois input on n, X input lines $$X_0, \ldots, X_{n-1}$$

and from the Galois input on n, Y input lines
$$Y_0, \ldots, Y_{n-1}$$

comprising:
a single GF($2^m$) Galois multiplication gate having the Galois subfield GF($2^m$), where m is a positive integral divisor of n having the relationship of k=n/m and where k is a positive integer greater than 1, k>1, which single GF($2^m$) Galois multiplication gate generates $k^2$ subfield GF($2^m$) Galois partial products;

X input register means for bi-serially receiving said n-bit X input and for sequentially bit-parallelly coupling m-bit portions of said n-bit X input to said single GF($2^m$) Galois multiplication gate;

Y input register means for bit-serially receiving said n-bit Y input and for sequentially bit-parallelly coupling m-bit portions of n-bit Y input to said single GF($2^m$) Galois multiplication gate;

$$\cdot t^{2m-2}, \cdot t^{2m-3}, \ldots, \cdot t^d, \ldots, \cdot t^2, \cdot t, \cdot 1,$$

·0 constant multiplier means responsively coupled to said single GF($2^m$) Galois multiplication gate for seuentially receiving said $k^2$ subfield GF($2^m$) Galois partial products and sequentially generating $k^2$ sets of GF($2^m$)·$t^d$ or GF($2^m$) ·0 Galois partial products therefrom; and, accumulator means sequentially receiving and accumulating said $k^2$ sets of subfield $GF(2^m) \cdot t^d$ or $GF(2^m) \cdot 0$ Galois partial products for generating and bit-serially outputting said n-bit Galois product $X \cdot Y$.

3. A Galois $GF(2^n)$ multiplication gate for performing the Galois multiplication in the Galois field $GF(2^n)$ which Galois $GF(2^n)$ multiplication gate generates the Galois product $X \cdot Y = (X \cdot Y)_0, \ldots, (X \cdot Y)_{n-1}$ from the Galois input on n, X input lines $$X_0, \ldots, X_{n-1}$$

and from the Galois input on n, Y input lines $$Y_0, \ldots, Y_{n-1}$$

comprising:

$GF(2^m)$ Galois multiplication gate means having the Galois subfield $GF(2^m)$, where m is a positive integral divisor of n having the relationship of $k = n/m$ and where k is a positive integer greater than 1, $k > 1$, which $GF(2^m)$ Galois multiplication gate means generates $k^2$ subfield $GF(2^m)$ Galois partial products;

input sequencer means for receiving said Galois input on said n, X input lines and said Galois input on said n, Y input lines and sequentially coupling m-bit segments of $X(X_m)$ and $Y(Y_m)$ to said $GF(2^m)$ Galois multiplication gate means;

$\cdot t^{2m-2}, \cdot t^{2m-3}, \ldots, \cdot t^d, \ldots, \cdot t^2 \cdot t, \cdot 1, \cdot 0$ constant multiplier means responsively coupled to said $GF(2^m)$ Galois multiplication gate means for sequentially receiving said $k^2$ subfield $GF(2^m)$ Galois partial products and sequentially generating $k^2$ sets of $GF(2^m) \cdot t^d$ or $GF(2^m) \cdot 0$ Galois partial products therefrom;

n/m multiplexer means, each receiving in parallel, said $k^2$ sets of $GF(2^m) \cdot t^d$ or $GF(2^m) \cdot 0$ Galois products from said constant multiplier means;

n/m toggle means, each coupled to a respectively associated one of said n/m multiplexer means for receiving the output therefrom;

output register means coupled to each of said n/m toggle means for receiving and formatting the outputs therefrom in an n-bit format, and control sequencer means coupled to said input sequencer means, said n/m multiplexer means and said n/m toggle means for sequentially processing said m-bit segments of $X(X_m)$ and $Y(Y_m)$ from said input sequencer means to form said Galois product $X \cdot Y$ at said output register means.

4. A Galois $GF(2^n)$ multiplication gate for performing the Galois multiplication in the Galois field $GF(2^n)$ which Galois $GF(2^n)$ multiplication gate generates the Galois product $X \cdot Y = (X \cdot Y)_0, \ldots, (X \cdot Y)_{n-1}$ from the Galois input on n, X input lines $$X_0, \ldots, X_{n-1}$$

and from the Galois input on n, Y input lines $$Y_0, \ldots, Y_{n-1}$$

comprising:

$GF(2^m)$ Galois multiplication gate means having the Galois subfield $GF(2^m)$, where m is a positive integral divisor of n having the relationship of $k = n/m$ and where k is a positive integer greater than 1, $k > 1$, which $GF(2^m)$ Galois multiplication gate means generates $k^2$ subfield $GF(2^m)$ Galois partial products;

X input register means for bit-serially receiving said n-bit X input and for sequentially bit-paralelly coupling m-bit portions of said n-bit X input to said $GF(2^m)$ Galois multiplication gate means;

Y input register means for bit-serially receiving said n-bit Y input and for sequentially bit-parallelly coupling m-bit portions of said n-bit Y input to said $GF(2^m)$ Galois multiplication gate means;

$X_m \cdot Y_m$ register means for receiving and storing said $k^2$ subfield $GF(2^m)$ Galois partial products from said $GF(2^m)$ multiplication gate means;

$\cdot t^d$ constant multiplier means receiving said $k^1$ subfield $GF(2^n)$ Galois partial products from said $X_m \cdot Y_m$ register means for performing the appropriate constant multiply for each of said $k^2$ subfield $GF(2^m)$ Galois partial products;

Galois sum means for receiving the output of said $\cdot t^d$ constant multiplier means;

output register means for receiving said storing the output of said Galois sum means; and, multiplexer means sequentially coupling the contents of said output register means to said Galois sum means for sequentially enabling said Galois sum means to perform the Galois sum of the output of said $\cdot t^d$ constant multiplier means and said output register means for each of said $k^2$ subfield $GF(2^m)$ Galois partial products and generating in said output register means said Galois product $X \cdot Y$.

5. The Galois $GF(2^n)$ multiplication gate of claim 4 in which said $GF(2^m)$ multiplication gate means is a PROM.

6. The Galosis $GF(2^n)$ multiplication gate of claim 4 in which said $\cdot t^d$ constant multiplier means is a $\cdot t^d$ PROM means.

7. The Galois $GF(2^n)$ multiplication gate of claim 6 further including $\cdot t^d$ Select PROM means coupled to said $\cdot t^d$ PROM means for enabling said $\cdot t^d$ PROM means to select the appropriate constant multiply for each of said $k^2$ subfield $GF(2^m)$ Galois partial products.

8. A Galois $GF(2^n)$ multiplication gate for performing the Galois multiplication in the Galois field $GF(2^n)$ which Galois $GF(2^n)$ multiplication gate generates the Galois product $X \cdot Y = (X \cdot Y)_0, \ldots, (X \cdot Y)_{n-1}$ from the Galois input on n, X input lines $$X_0, \ldots, X_{n-1}$$

and from the Galois input on n, Y input lines $$Y_0, \ldots, Y_{n-1}$$

comprising:

$GF(2m)$ Galois multiplication gate means having the Galois subfield $GF(2^m)$, where m is a positive integral divisor of n having the relationship of $k = n/m$ and where k is a positive integer greater than 1, $k > 1$, which $GF(2^m)$ Galois multiplication gate means generates $k^2$ subfield $GF(2^m)$ Galois partial products;

X input means for receiving said n-bit X input and for sequentially coupling m-bit portions of said n-bit X input to said $GF(2^m)$ Galois multiplication gate means;

Y input means for receiving said n-bit Y input and for sequentially coupling m-bit portions of said n-bit Y input to said $GF(2^m)$ Galois multtiplication gate means;

$X_m \cdot Y$ means for receiving and storing said $k^2$ subfield $GF(2^m)$ Galois partial products from said $GF(2^m)$ multiplication gate means;

$\cdot t^d$ constant multiplier means receiving said $k^2$ subfield $GF(2^m)$ Galois partial products from said $X_m \cdot Y_m$ means for performing the appropriate constant multiply for each of said $k^2$ subfield $GF(2^m)$ Galois partial products;

Galois sum means for receiving the output of said $\cdot t^d$ constant multiplier means;

output means for receiving and storing the output of said Galois sum means; and, multiplexer means sequentially coupling the contents of said output means to said Galois sum means for sequentially enabling said Galois sum means to perform the Galois sum of the output of said $\cdot t^d$ constant multiplier means and said output means for each of said $k^2$ subfield $GF(2^m)$ Galois partial products and generating in said output means said Galois product $X \cdot Y$.

9. The Galois $GF(2^n)$ multiplication gate of claim 8 further including $\cdot t^d$ Select means coupled to said $\cdot t^d$ constant multiplier means for enabling said $\cdot t^d$ constant multiplier means to select the appropriate constant multiply for each of said $k^2$ subfield $GF(2^m)$ Galois partial products.

10. A Galois $GF(2^n)$ linear gate for performing the Galois linear operation in the Galois field $GF(2^n)$ which Galois $GF(2^n)$ linear gate generates the Galois linear resultant $X \cdot Y + Z = (X \cdot Y + Z)_0, \ldots, (X \cdot Y + Z)_{n-1}$ from the Galois input on n, X input lines $$X_0, \ldots, X_{n-1}$$

from the Galois input on n, Y input lines
$$Y_0, \ldots, Y_{n-1}$$

and from the Galois input on n, Z input lines
$$Z_0, \ldots, Z_{n-1}$$

comprising:

a single $GF(2^m)$ Galois multiplication gate having the Galois subfield $GF(2^m)$, where m is a positive integral divisor of n having the relationship of $k = n/m$ and where k is a positive integer greater than 1, $k > 1$, which single $GF(2^m)$ Galois multiplication gate generates $k^2$ subfield $GF(2^m)$ Galois partial products;

input sequencer means receiving said X and Y n-bit inputs and sequential coupling k m-bit portions of each of said X and Y n-bit inputs to said single $GF(2^m)$ Galois multiplication gate for enabling said single $GF(2^m)$ Galois multiplication gate to sequentially generate said $k^2$ subfield $GF(2^m)$ Galois partial products therefrom; and, means, including constant multiplier means, responsively coupled to said single $GF(2^m)$ Galois multiplication gate and to said Z n-bit inputs for sequentially accumulating said sequentially generated $k^2$ subfield $GF(2^m)$ partial products and providing on n output lines the n-bit Galois linear resultant $X \cdot Y + Z$.

11. A Galois $GF(2^n)$ linear gate for performing the Galois linear operation in the Galois field $GF(2^n)$ which Galois $GF(2^n)$ linear gate generates the Galois linear resultant $X \cdot Y + Z = (X \cdot Y + Z)_0, \ldots, (X \cdot Y + Z)_{n-1}$ from the Galois input on n, X input lines $$X_0, \ldots, X_{n-1}$$

from the Galois input on n, Y input lines
$$Y_0, \ldots, Y_{n-1}$$

and from the Galois input on n, Z input lines
$$Z_0, \ldots, Z_{n-1}$$

comprising:

$GF(2^m)$ Galois multiplication gate means having the Galois subfield $GF(2^m)$, where m is a positive integral divisor of n having the relationship of $k = n/m$ and where k is a positive integer greater than 1, $k > 1$, which $GF(2^m)$ Galois multiplication gate means generates $k^2$ subfield $GF(2^m)$ Galois partial products;

X input means for receiving said n-bit X input and for sequentially coupling m-bit portions of said n-bit X input to said $GF(2^m)$ Galois multiplication gate means;

Y input means for receiving said n-bit Y input and for sequentially coupling m-bit portions of said n-bit Y input to said $GF(2^m)$ Galois multiplication gate means;

$X_m \cdot Y_m$ means for receiving and storing said $k^2$ subfield $GF(2^m)$ Galois partial products from said $GF(2^m)$ multiplication gate means;

Z input means for receiving said n-bit Z input and for sequentially coupling m-bit portions of said n-bit Z input to said $X_m \cdot Y_m$ means;

said $X_m \cdot Y_m$ means forming $k^2$ subfield $GF(2^m)$ Galois partial resultants from said $k^2$ subfield $GF(2^m)$ Galois partial products and said m-bit portions of said n-bit Z input;

$\cdot t^d$ constant multiplier means receiving said $k^2$ subfield $GF(2^n)$ Galois partial resultants from said $X_m \cdot Y_m$ means for performing the appropriate constant multiply for each of said $k^2$ subfield $GF(2^m)$ Galois partial resultants;

Galois sum means for receiving the output of said $\cdot t^d$ constant multiplier means;

output means for receiving and storing the output of said Galois sum means; and, multiplexer means sequentially coupling the contents of said output means to said Galois sum means for sequentially enabling said Galois sum means to perform the Galois sum of the output of said $\cdot t^d$ constant multiplier means and said output means for each of said $k^2$ subfield $GF(2^m)$ Galois partial resultants and generating in said output means said Galois linear resultant $X \cdot Y + Z$.

* * * * *

UNITED STATES PATENT AND TRADEMARK OFFICE
CERTIFICATE OF CORRECTION

PATENT NO. : 4,251,875

DATED : 5/21/81

INVENTOR(S) : James M. Marver, Wayne R. Olson

It is certified that error appears in the above-identified patent and that said Letters Patent are hereby corrected as shown below:

Column 2, Line 2, "K=(n/m)" should be --k=n/m--.

Column 2, Line 14, "k=(n/m)" should be --k=n/m--

Column 3, Line 4, after "constructed", change "on" to --or--.

Column 4, Line 38 "(n/m)=2" should be --n/m=2--.

Column 10, Line 52, "bi-serially" should be --bit-serially--.

Column 10, Line 58, "of n-bit" should be --of said n-bit--.

Column 10, Line 63, "seuen-" should be --sequen- --.

Column 11, Line 30, after "$t^2$" should be --,--.

Column 12, Line 4, "paralelly" should be --parallelly--.

Column 12, Line 14, "$k^1$" should be --$k^2$--.

Column 12, Line 21, "said" should be --and--.

Column 12, Line 54, "GF(2m)" should be --$GF(2^m)$--.

UNITED STATES PATENT AND TRADEMARK OFFICE
CERTIFICATE OF CORRECTION

Page 2 of 2

PATENT NO. : 4,251,875
DATED : 5/21/81
INVENTOR(S) : James M. Marver, Wayne R. Olson It is certified that error appears in the above-identified patent and that said Letters Patent are hereby corrected as shown below:

Column 12, Line 67, "multtiplication" should be --multiplication--.

Column 13, Line 1, "$X_m \cdot Y$" should be --$X_m \cdot Y_m$--.

Signed and Sealed this

Eighteenth Day of August 1981

[SEAL]

Attest:

GERALD J. MOSSINGHOFF

Attesting Officer

Commissioner of Patents and Trademarks